United States Patent [19]

Hawkins

[11] Patent Number: 4,734,972
[45] Date of Patent: Apr. 5, 1988

[54] TUBE PLUG REMOVAL MACHINE

[75] Inventor: Phillip J. Hawkins, Penn Hills Township, Allegheny County, Pa.

[73] Assignee: Westinghouse Electric Corp., Pittsburgh, Pa.

[21] Appl. No.: 819,084

[22] Filed: Jan. 15, 1986

[51] Int. Cl.⁴ ............................................. B23P 15/26
[52] U.S. Cl. ..................... 29/426.4; 29/255; 29/256; 29/263; 29/264; 29/723; 29/726; 29/727; 165/71
[58] Field of Search ............. 29/723, 726, 727, 426.4, 29/255, 256, 263, 264; 138/89; 165/71

[56] References Cited

U.S. PATENT DOCUMENTS

| 3,120,700 | 2/1964 | Chuplis, Jr. | |
|---|---|---|---|
| 3,126,766 | 3/1964 | Bent | |
| 3,512,433 | 5/1970 | Johasz et al. | |
| 3,767,313 | 10/1973 | Bohoroquez et al. | 408/14 |
| 4,111,590 | 9/1978 | Burkart et al. | 408/14 |
| 4,182,588 | 1/1980 | Burkart et al. | 408/14 |
| 4,213,239 | 7/1980 | Filer | |
| 4,214,362 | 7/1980 | Beard | 29/726 |
| 4,280,274 | 7/1981 | Filer | 29/726 |
| 4,312,124 | 1/1982 | Calhoun | 29/726 |
| 4,366,617 | 1/1983 | Nanstiel et al. | 29/727 |
| 4,369,662 | 1/1983 | Rieben et al. | 73/826.01 |
| 4,390,042 | 6/1983 | Kucherer et al. | 138/89 |
| 4,443,139 | 4/1984 | Eash | 408/14 |
| 4,555,833 | 12/1985 | Hawkins et al. | 29/33 T |

Primary Examiner—Howard N. Goldberg
Assistant Examiner—Taylor J. Ross
Attorney, Agent, or Firm—Donald M. Satina

[57] ABSTRACT

The tube plug removal machine removes any type of tube plug by drilling into a plug portion with a tap drill bit, engaging that plug portion with a threaded section of the tap drill bit after the drilled hole has been threaded by a tapping section thereof, and removing a portion of the tube holding the plug in the tube with a counterbore drill bit mounted concentrically about the tap drill bit. A trip pin and trip spline enable the tap drill bit to be automatically disengaged from the motor once the tap drill bit has been threaded into engagement with the plug. The conterbore drill bit is thereafter self-centered with respect to the tube and plug about the now stationary tap drill bit. After a portion of the plug has been removed by the counterbore drill bit, pulling on the tap drill bit will remove the remaining plug portion from the tube.

23 Claims, 6 Drawing Sheets

TUBE PLUG REMOVAL MACHINE

BACKGROUND OF THE INVENTION

This invention relates to plug removal apparatus and more particularly to apparatus for removing plugs from plugged heat exchanger tubes.

In tube type heat exchangers, a first fluid flows through the tubes of the heat exchanger while a second fluid surrounds the outside of the tubes such that heat exchange occurs between the two fluids. Occasionally, one of the tubes can become defective and leak, resulting in commingling of the two fluids. When this occurs, it is sometimes necessary to plug the tube so that the fluid does not flow through the tube, thereby preventing leakage from the tube.

In nuclear reactor power plants, the tube type heat exchangers are commonly referred to as steam generators. When a defect occurs in the tubes of the nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube is plugged so that the coolant is not permitted to flow through the tube. This prevents contamination of the fluid surrounding the tubes.

There are several kinds of plugs that may be used to plug the heat exchange tubes. One such device used to plug heat exchange tubes in nuclear reactors is an explosive plugging device. With the explosive plugging devices, a metal plug is inserted into the heat exchange tube with an explosive contained within the plug. When the explosive is detonated, the plug is forced into close contact with the inside of the tube, thus blocking flow through the tube. One problem associated with explosive plugging is that should it become necessary to replace the defective tube, a portion thereof, or a defective plug, the explosive plug must be drilled out. Plug removal with conventional drills is time consuming and requires great care for minimization of damage to the tube walls.

A device used more commonly to plug heat exchange tubes is generally referred to as a mechanical plug. In U.S. Pat. No. 4,390,042 to H. D. Kucherer et al., issued June 28, 1983 and entitled "Tube Plug", the disclosure of which is incorporated herein by reference, is described a mechanical plug comprising a cylindrical shell member closed at one end and having a tapered inner bore. An expander member is disposed in the cylindrical member such that when the expander member is drawn along the longitudinal axis of the cylindrical member, the outer surface of the cylindrical member is forced into close contact with the inner surface of the heat exchange tube due to the relative tapers of the inner surface of the cylindrical member and the expander member. In U.S. Pat. No. 4,369,662 to S. L. Rieben et al., issued Jan. 25, 1983 and entitled "Plug Installation Apparatus", the disclosure of which is incorporated herein by reference, is described an apparatus for installing a mechanical plug such as the plug described above by moving the expander member relative to the cylindrical shell member.

In a mechanical tube plug, no explosives are necessary to create the close contact between the plug and the heat exchange tube. Rather, the expansion of the plug is caused by the relative movement of the expander member within the plug. This gives the mechanical plug the characteristic of being able to be removed without being drilled out. U.S. Pat. No. 4,366,617 to W. F. Nanstill et al. issued January 4, 1983 and entitled "Plug Removal Apparatus", the disclosure of which is incorporated herein by reference, describes an apparatus for removing a mechanical plug. This apparatus is adapted to screw into the threaded end of the cylindrical shell member, push the expander relative to the plug to relieve the pressure on the plug, then to extract the plug by pulling.

However, particularly in cases of plugs which have been in service for prolonged periods of operation, the contact force remaining after movement of the expander member may be sufficient to cause scoring of the tube wall upon withdrawal of the plug from the tube. Such tube wall scoring hampers subsequent repair or plug replacement operations. Also, some plugs have become jammed in tubes by improper installation to such an extent that they cannot be pulled out of the tube even after the expander member has been retracted. Also, because the channel head is a relatively small area in which to work, it is required that whatever apparatus or device is used to remove the plugs from the plugged tubes in the tube bundle be capable of being operated in a relatively small space. In addition, because the channel head is radioactive, the device must be easy to manipulate and capable of removing plugs from plugged tubes in a relatively short period of time so as to prevent personnel from prolonged radiation exposure.

U.S. patent application Ser. No. 06/588,422 filed March 12, 1984 in the name of P. J. Hawkins and entitled "Mechanical Plug Drill", the disclosure of which is incorporated herein by reference, describes a lightweight self-centering tube plug drill which solves the problems described above. Therein, a centering and retaining pin is threaded into the threaded portion of the sleeve at the closed end of the plug for pulling the plug out of the tube. However, since not all mechanical plugs are provided with this threaded portion, the device cannot be used to remove many plugs now in service. Therefore, what is needed is an apparatus which is relatively small and easy to manipulate yet is capable of quickly removing any kind of plug from plugged tubes without damaging the walls of the plugged tubes.

SUMMARY OF THE INVENTION

The invention is a device for removing plugs from plugged tubes in a steam generator. The device has a gearbox and a tap drill bit extending through the gearbox. The tap drill bit is movable with respect to the gearbox from a storage position to an operating position and has a drill point, a tapping section, a threaded section, and a stop section for respectively drilling into the top of the plug, tapping the drilled hole, and engaging the newly cut threads with the threaded section up to the stop section of the tap drill bit. The device also has a counterbore drill bit mounted concentrically about the tap drill bit and movable from a storage position to an operating position. The counterbore drill bit is sized to a predetermined diameter not exceeding the inner diameter of the tube. The device also has coupling means for coupling the tap drill bit to the counterbore drill bit; motor means for rotating the counterbore drill bit and, when coupled by the coupling means to the counterbore drill bit, the tap drill bit; axial indexing means for axially indexing the counterbore drill bit and, when coupled by the coupling means to the counterbore drill bit, the tap drill bit; and disengaging means for disengaging the coupling means when the tap drill bit has threaded into the newly tapped hole up to the stop section of the tap drill bit, thereby uncoupling the tap drill bit from the counterbore drill bit. The preferred coupling means is a trip pin and the preferred disengaging means is a trip spline. The device may have a frame for supporting the device beneath the tube sheet through camlocks.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENT

It is sometimes necessary to remove a plug from a heat exchange tube. The invention described herein provides plug removal apparatus for effectively removing a tube plug from a heat exchange tube, and more particularly, provides a tube plug drill which can engage and remove all types of tube plugs.

Figures 1, 9:
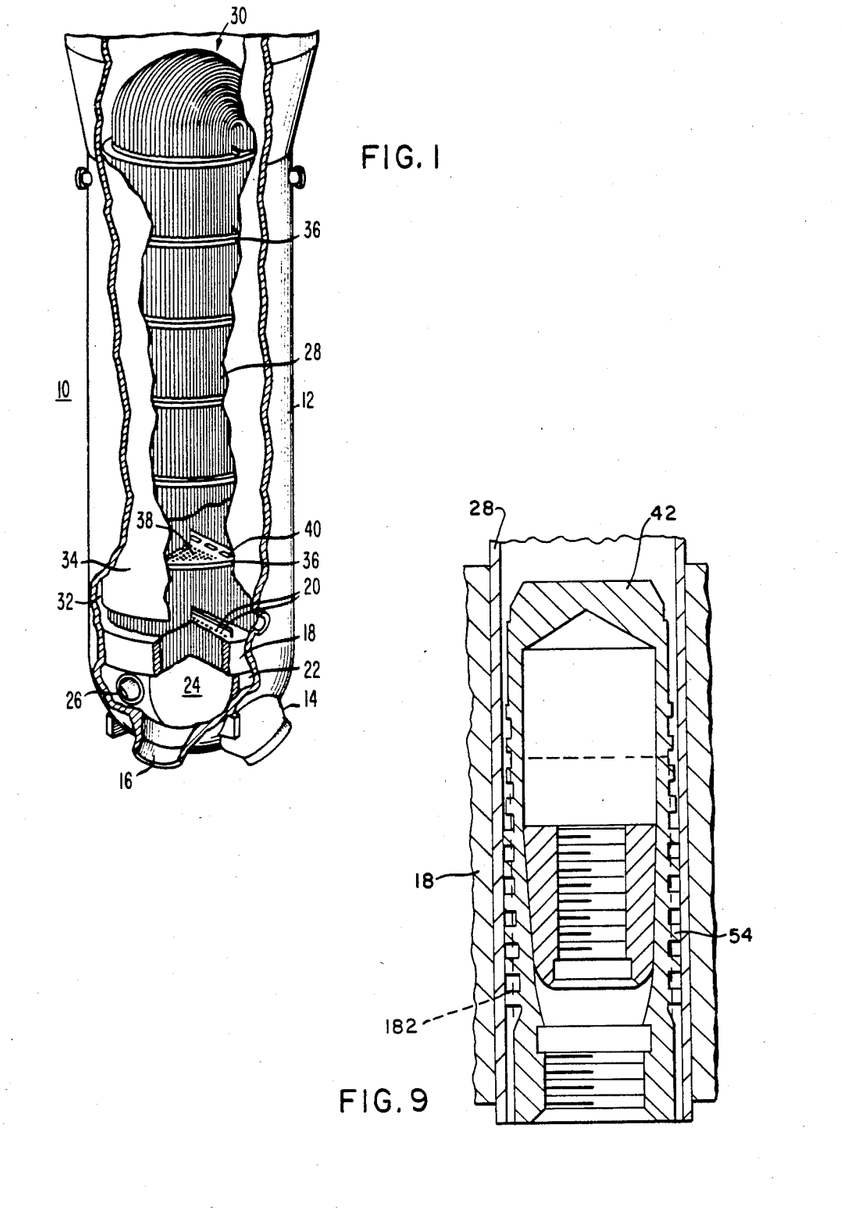
FIG. 1 is a partial cross-sectional view in elevation of a portion of a typical steam generator.
FIG. 9 is a partial cross-sectional view in elevation of a mechanical plug with the preferred drilling pattern indicated by dotted lines.

Referring to FIG. 1, the steam generator 10 is comprised of an outer shell 12 with a primary fluid inlet nozzle 14 and a primary fluid outlet nozzle 16 attached near the lower end of the shell. A generally cylindrical tube sheet 18 having tube holes 20 therein is also attached to the outer shell 12 near its lower end defining therewith a channel head 22. A dividing plate 24 in the channel head 20 attached to both the tube sheet 18 and the outer shell 12 divides the channel head 22 into a primary fluid inlet plenum and a primary fluid outlet plenum, as is well understood in the art. Access to the channel head 22 is through one of two manways 26 (only one shown) provided in the shell 12.

Tubes 28 are heat transfer tubes with a U-curvature disposed within the outer shell 12 and attached to the tube sheet 18 through the tube holes 20. Tubes 28, which may number about 4000, form a tube bundle 30. In addition, a secondary fluid inlet nozzle (not shown) is disposed in the outer shell 12 above the top of the curvature in the tubes 28 for providing a secondary fluid, such as feedwater, which flows downwardly through an annular space 32 between the outer shell 12 and the inner wrapper 34, which does not extend completely to the tube sheet 18. The secondary fluid contacts the tube sheet 18 and flows under the wrapper 34 and thence upwardly against the tubes 28 of the bundle 30 where a portion of the water is converted to steam which exits the steam generator 10 through a steam outlet at the top thereof (not shown).

A plurality of axially spaced support plates or baffles 36 which, as illustrated, have holes 38 therein axially in registry, respectively, with the holes 20 provided in tube sheet 18, thereby to provide lateral support to the individual tubes 28 in the tube bundle 30. Larger apertures or flow slots 40 are disposed in the support plates or baffles 36 to facilitate movement of the secondary fluid or feedwater as well as steam through the steam generator 10.

In operation, the primary fluid, which may be water having been heated by circulation through a nuclear core, enters the steam generator 10 through the primary inlet nozzle 14 and flows into the primary fluid plenum defined by the dividing plate 24 in the adjacent portion of the outer shell 12. From the primary fluid plenum, the primary fluid flows upwardly through the tubes 28 supported by the tube sheet 18, then upwardly through the U-curvature of the tubes, and thence downwardly through the tubes into the primary fluid outlet plenum and thence through the primary fluid outlet nozzle 16. The primary fluid is then returned to the nuclear core. Secondary fluid is provided to the top of the steam generator 10 through a secondary fluid inlet nozzle (not shown), flows downwardly through annular space 32 formed between outer shell 12 and wrapper 34 until it contacts the tube sheet 18, whereupon it is directed upwardly and about tubes 28 within tube bundle 30. Heat is transferred from the primary fluid flowing through tubes 28 to the secondary fluid which surrounds the tubes 28, causing some of the secondary fluid to vaporize. The resulting steam then exits the steam generator 10 through the steam outlet nozzle (not shown).

Due to the presence of various corrosive elements, temperature gradients encountered by the tubes 28, as well as mechanical vibration induced by the flow of the secondary fluid through the steam generator 10, the tubes 28 in the tube bundle 30 degrade with time. Since the primary fluid is radioactive due to its contact with the nuclear core, it is imperative to maintain a strict separation of the primary fluid from the secondary fluid to prevent contamination of the secondary fluid. In this respect, it becomes apparent that when individual tubes 28 in the tube bundle 30 become degraded, it is necessary to plug these tubes so as to prevent the flow of primary fluid therethrough.

Figure 2:
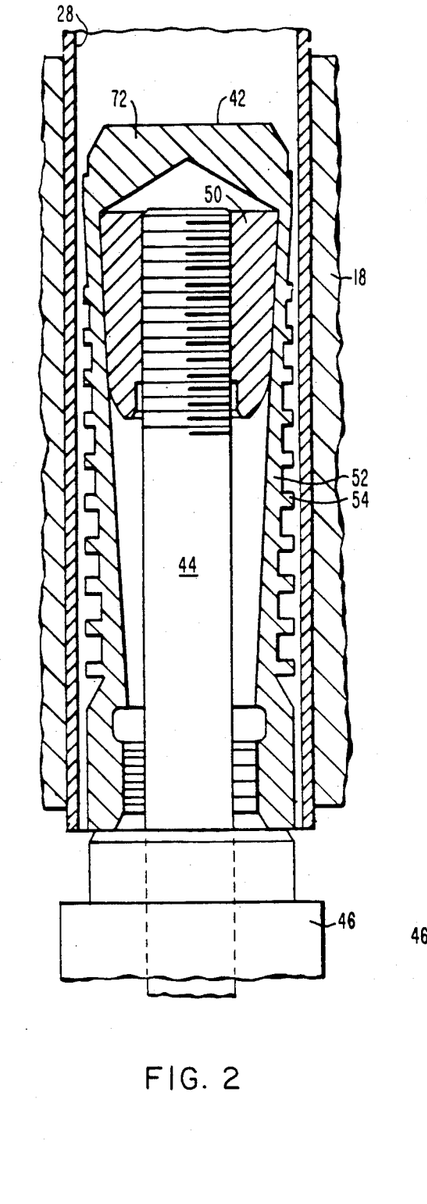
FIG. 2 is a cross-sectional view in elevation of the tube plug in the unexpanded condition within a heat exchange tube and a portion of the installation apparatus in elevation.
Figure 3:
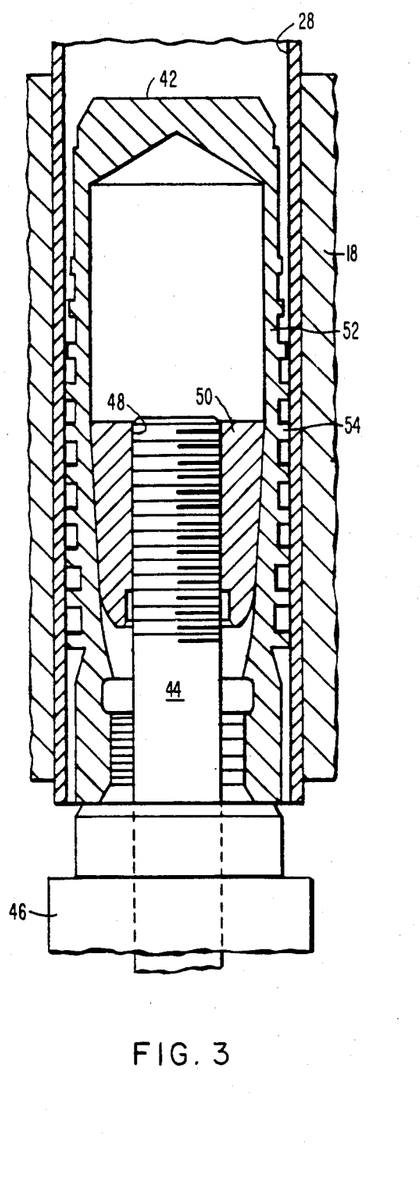
FIG. 3 is a cross-sectional view in elevation of the tube plug as expanded within a heat exchange tube and a portion of the installation apparatus in elevation.

Various plugs are available which have been successfully used in steam generators to plug the heat transfer tubes therein, such as the mechanical plug described in the aforementioned U.S. Patent No. 4,390,042 issued in the name of Kucherer et al. FIG. 2 depicts such a plug 42 in the unexpanded state positioned within the tube 28 at the tube sheet 18 and positioned on the drawbar 44 of a tube expanding device, a portion of which is shown as 46. FIG. 3 depicts the same plug 42 in the expanded condition after drawbar 44 has engaged the internal threads 48 of expander member 50 and tube plug expanding device 46 has pulled the expander member 50 relative to shell 52 of the plug, causing shell 52 to expand until lands 54 contact the heat exchange tube 28. Such plugs are entirely affective to seal the tubes and to remove them from operation, thereby preventing any contamination of the secondary fluid or feedwater by contact with the primary fluid. However, there are times when such plugs have to be removed. A preferred method of plug removal is by mechanically drilling the plug 42 from the associated tube 28 so as to free the tube for repair or reconstruction.

Since access to the tubes 28 is primarily through the channel head 22, it will be understood that the working space is limited and the device or mechanical plug drill must be specially designed to accommodate the small working space. In addition, certain steam generators do not use U-shaped tubes, but rather straight tubes and when drilling plugs of the type disclosed in the heretofore referenced Kucherer et al. patent, the plug sleeve may fall into the tube if the plug is at the top of the tube. Accordingly, it has been a problem in the past to ensure that a portion of the plug being removed does not fall into the tube of steam generators using vertically oriented straight tubes.

Figure 4:
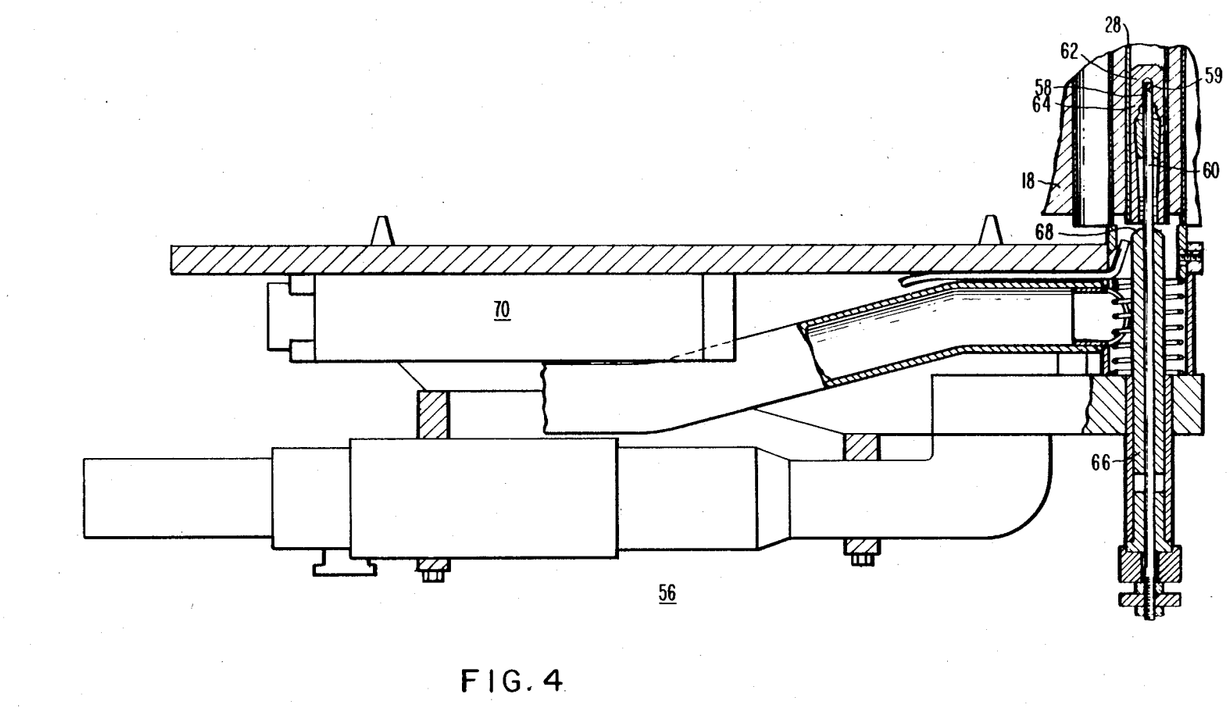
FIG. 4 is a partial cross-sectional view in elevation of a mechanical plug drill.

FIG. 4 depicts a tube plug drill 56 according to co-pending U.S. patent application Ser. No. 588,422 in the name of Hawkins et al. and entitled "Mechanical Plug Drill". This device is shown as it would appear when suspended from the tube sheet 18. In operation of this device, the external threads 58 on the end of the retaining and centering pin 60 engage the internal threads 59 of a sleeve portion 62 of a mechanical plug 64. A hollow elongated drill bit 66 having a cutting end 68 is rotated and axially indexed with respect to the retaining and centering pin 60 causing the cutting end 68 to come into contact with the outer end of the plug 64. The plug 64 is drilled a sufficient distance to release the same from the associated tube 28, whereupon drilling is ceased and the remaining plug portion is drawn out of the tube 28 by applying an axial force on pin 60.

A comparison of the plug 42 in FIG. 2 and the plug 64 in FIG. 4 reveals that plug 42 is not provided with the threads 59 in sleeve 62 of plug 64. The centering and retaining pin 60 of the tube plug drill 56 depicted in FIG. 4 cannot be threaded into the sleeve portion 72 of plug 42. Therefore, tube plug drill 56 cannot be used to remove the plug depicted in FIG. 2 until and unless a hole is drilled and tapped in the sleeve portion 72 of the plug. This extra step results in greater radiation exposure for the operator of the device. Therefore, a tube plug drilling device which can be used to remove the type of plug depicted in FIG. 2 without the additional drilling and tapping step is needed.

Figure 5:
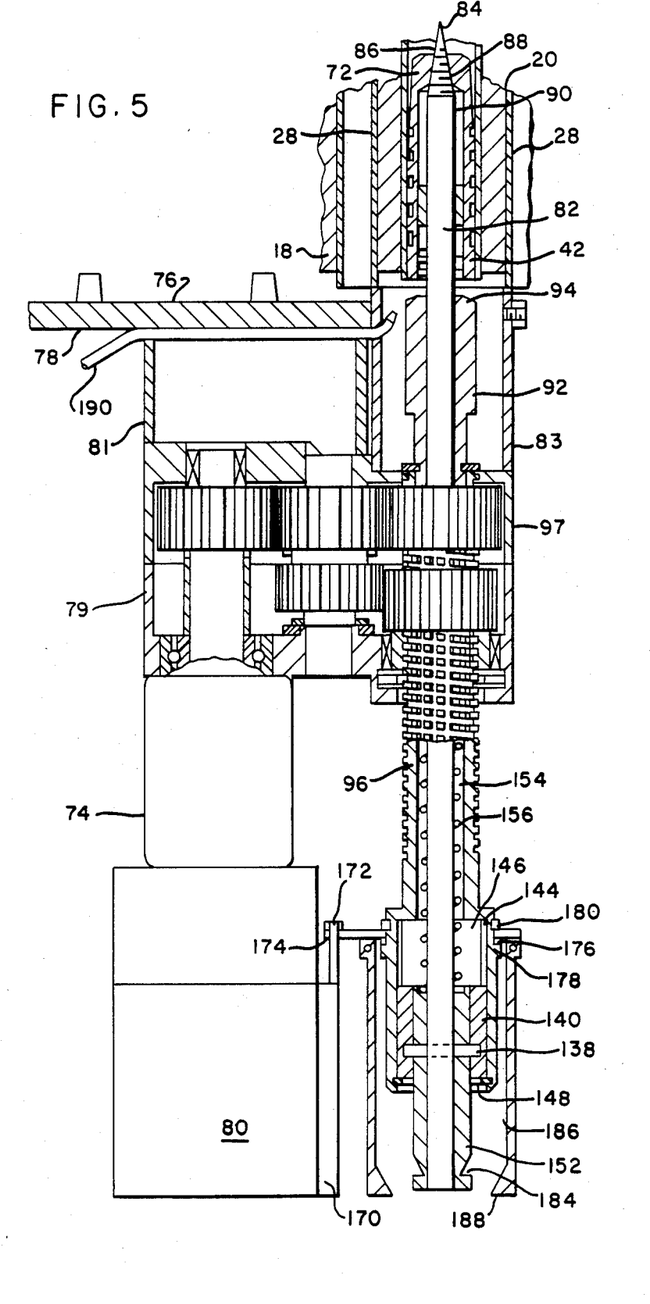
FIG. 5 is a partial cross-sectional view in elevation of a preferred tube plug removal device according to the present invention as supported from a typical steam generator tube sheet.

FIG. 5 depicts the tube plug removal machine 74 according to the present invention. One preferred embodiment of machine 74 is suspended from the tube sheet 18 by a frame 76 in the form of a generally rectangular flat or planar plate 78 which is attached by locking means such as camlocks (not shown) inserted into the ends of some of the tubes 28 within holes 20. A hand-held version of the machine 74 (not shown) does not require a frame for support but is otherwise the same as the embodiment depicted in FIG. 5. The machine 74 has a gearbox 79 and a motor means such as the air motor 80 depicted in FIG. 5, which may be attached to the frame 76 through suitable attachment means such as block 81. The tube plug removal machine is further made up of an elongated tap drill bit 82 which is mounted for movement with respect to the gearbox 79 from a storage position generally within shroud 83 to the operating position shown in FIG. 5 wherein the bit 82 is inserted into the tube 28 and plug 42. Tap drill bit 82 has disposed at one end thereof a drill point 84 for drilling a hole in the plug, a tapping section 86 for tapping threads into the hole, a threaded section 88 for threading into the threaded hole, and a stop section 90. Disposed about and axially translatable with respect to tap drill bit 82 is a hollow or counterbore drill bit 92 having a cutting end 94. The counterbore drill bit 92 is fixedly attached to a threaded splined drill carrier 96. In place of a splined drill carrier, a threaded hexagonal carrier or other geometric cross section capable of being driven can be used.

The drill carrier 96 and the attached counterbore drill bit 92 are rotated and axially indexed through the motor means by way of axial indexing means from a storage position generally as shown in FIG. 5 to an operating position wherein counterbore drill bit 92 contacts plug 42 and machines away plug material by drilling. The preferred embodiment of the axial indexing means 97 is most clearly depicted in FIG. 6. A drive gear 98 is fixedly attached to the output shaft 100 of air motor 80 within gearbox 79. The drive gear teeth 102 match with the teeth (not visible) of idler gear 106 which is attached to idler shaft 108. The teeth of idler gear 106 mesh with the teeth 110 of splined drive gear 112. The splined cavity 114 within splined drive gear 112 is sized to tightly accommodate splined drill carrier 96 therewithin. A clockwise rotation of shaft 100 by gear motor 80 would result in a counterclockwise rotation of idler gear 106 and a clockwise rotation of splined drive gear 112 and the splined drill carrier 96 therewithin, imparting a clockwise rotation on drill bit 92. Since drive gear 98, idler gear 106 and splined gear 112 have an equivalent number of teeth, they rotate at the same speed.

Figure 6:
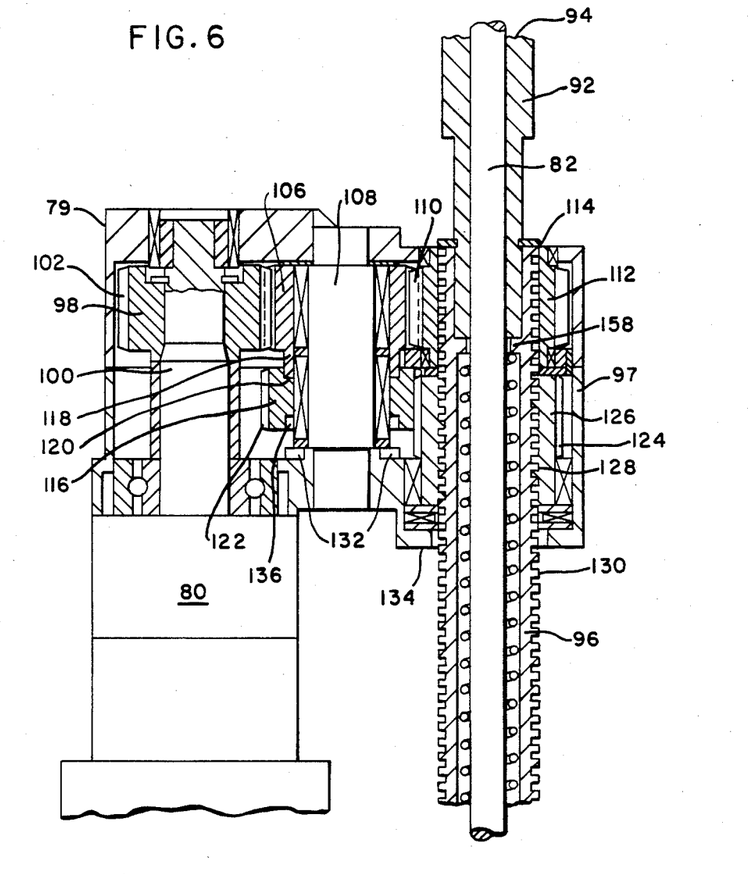
FIG. 6 is an enlarged partial cross-sectional view in elevation of a portion of the device shown in FIG. 5.

A shifter gear 116 is slidingly disposed on idler shaft 108 beneath idler gear 106. Shifter gear 116 is provided with locking prongs 118 which engage locking slots 120 in idler gear 106 when shifter gear is in the up or locked position as shown. Engagement of the prongs 118 in the slots 120 causes the shifter gear 116 to rotate with the idler gear 106. The teeth 122 of shifter gear 116 engage the teeth 124 of feed gear 126, which is disposed immediately beneath splined drive gear 112. Feed gear 126 is provided with internal threads 128 which mesh with external threads 130 about drill carrier 96. In the preferred embodiment, shifter gear 116 is provided with two teeth more than feed gear 126. This differential in the number of teeth facilitates the slow climb of the drill bit required for a drilling operation. The preferred rate of climb is in the range of 0.1 in./min. to 0.5 in./min. While idler gear 106 and shifter gear 116 are engaged through the locking prongs 118 and slots 120, they rotate at the same speed. However, the driven splined drive gear 112 rotates slightly slower than the driven feed gear 126 since shifter gear 116 has two more teeth than feed gear 126. The splined drill carrier 96 is rotated by the splined drive gear 112 at a slightly lower rotational velocity than the threaded feed gear 126 is rotating. With a clockwise rotation of the splined drill carrier 96, which is provided with left-hand threads, this speed differential causes the drill carrier to thread through the left-hand threaded feed gear, imparting a slow upward climb on the drill carrier 96 and the attached drill bit 92, which must be a right-hand drill bit. The tap drill bit used must correspond to the counterbore drill bit, i.e., be righthanded in this embodiment, since both are rotated in the same direction.

Alternatively, a right-hand threaded spline, right-hand threaded splined drive gear 112 and a right-hand threaded feed gear 126 can be used. In this embodiment, the splined drive gear is made to rotate counterclockwise to achieve the slow upward climb and a left-handed counterbore drill bit and tap drill bit are used to accommodate the counterclockwise rotation.

Shifter gear 116 can be shifted into the down or disengaged position through a suitable shifting means (not shown). In the down position, locking tabs 132 provided on gear box housing 134 engage locking recesses 136 in shifter gear 116. The locking of shifter gear 116 into housing 134 also locks feed gear 126 through the meshing of feed gear teeth 124 with shifter gear teeth 122. Rotation of drive gear 98 then rotates idler gear 106, splined drive gear 112 and drill carrier 96. Rotation of drill carrier 96 through left-hand threaded feed gear 126 results in rapid withdrawal of counterbore drill bit 92 which is attached to drill carrier 96 since the exterior threads 130 of drill carrier 96 are rotating through the interior threads 128 of stationary feed gear 126. Since rapid withdrawal of the counterbore drill bit is achieved with the air motor and drill carrier continuing to rotate clockwise, potential damage to the counterbore cutting edges by reverse rotation is eliminated. Suitable bearing means, which are not within the scope of this description are provided about each of the gears within the housing 134.

In the alternative embodiment, rapid withdrawal as well as slow advance is achieved with a counterclockwise rotation since a right-hand threaded feed gear and drill carrier and left-hand drill bits are used. Therefore, in each embodiment, the air motor is only required to run in one direction.

Proximate the end of tap drill bit 82 opposite the end bearing drill point 84 is provided a coupling means, which cooperates with a disengaging means for attaching the tap drill bit 82 to the counterbore drill bit 92 for simultaneous rotation until the tap drill bit has drilled, tapped and threaded into the plug, and then for releasing the tap drill bit from rotation with the counterbore drill bit 92. For plugs which have a threaded hole in their sleeve portion, the disengaging means is for releasing the tap drill bit from the counterbore drill bit after the tap drill bit has threaded into the hole. The preferred embodiment of the coupling means is a trip pin means such as trip pin 138 shown in FIG. 5. The preferred form of the disengaging means, which cooperates with the trip pin means for coupling the tap drill bit 82 to the counterbore drill bit 92, is a trip spline means. The preferred trip spline 140 is depicted in FIG. 5 and in greater detail in FIGS. 7 and 8. The trip spline 140 is provided with projections 142 which slidably engage vertical channels 144 within cavity 146 at the end of drill carrier 96 opposite the end attached to drill bit 92. The trip spline 140 is retained within cavity 146 by retainer 148. Trip pin 138 engages trip slots 150 in trip spline 140. Rotation of splined drive gear 112 then roates drill carrier 96, causing trip spline 140 to rotate therewith through engagement of projections 142 with vertical channels 144. The engagement of trip pin 138 with trip slot 150 causes tap drill bit 82 to rotate with drill carrier 96.

Figure 7:
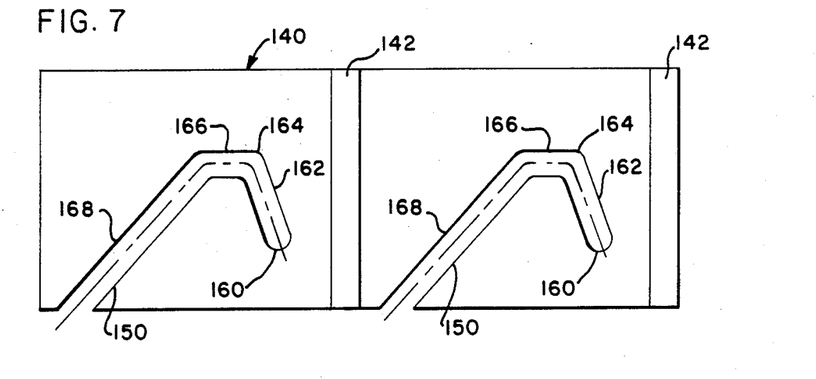
FIG. 7 is a view in elevation of the preferred trip spline shown cut and folded out.
Figure 8:
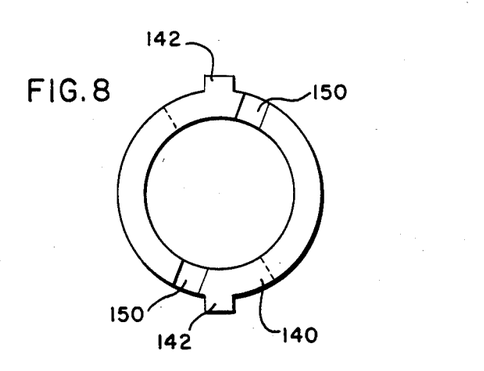
FIG. 8 is a bottom plan view of the trip spline of FIG. 7.

Between tap drill bit 82 and trip spline 140 is provided a tap drill bushing 152 through which extends trip pin 138. In a small diameter cavity 154 within drill carrier 96 is provided a spring 156 which is loaded between an annular ledge 158 within drill carrier 96 and against tap drill bushing 152. The force of spring 156 urges trip pin 138 against the ends 160 of trip slots 150. However, as tap drill pint 84 drills into a sleeve 72 of plug 42, the tapping section 86 taps the newly drilled hole, and the threaded section 88 threads into the hole, the tap drill bit 82 feeds upward relative to the drill carrier 96 and the trip spline 140. This relative motion of the tap drill bit with respect to the drill carrier results from the variation in pitch between the threads on the tap drill bit (0.01 to 0.03 in./rev.) and the feed rate of the drill carrier (0.001 to 0.005 in./rev/). Once the threads on the tap drill bit engage the threaded hole, the tap drill bit rises at a rate as much as ten times faster than the rate of climb of the drill carrier. This rapid rise of the tap drill bit with respect to the drill carrier acts to pull trip pin 138 up incline 162 in trip spline 140 to the end 164 thereof. Trip spline 140 remains relatively axially stationary due to frictional interaction between projections 142 and vertical channels 144 within cavity 146. Once trip pin 138 has reached point 164, it rapidly moves across horizontal slot portion 166, down exit incline slot portion 168, and out of the trip spline, disengaging tap drill bit 82 from drill carrier 96.

For plugs with existing holes in sleeve 72 and for other plugs which can only be loosely grasped by threaded section 88, tap drill bit 82 is provided with a stop section 90. Once tap drill bit has threaded into the sleeve up to the stop section, rotation of tap drill bit 82 is halted by the stop section and continued rotation of drill carrier 96 acts to force trip in 138 up incline 162 to end 164 across slot 166, down incline 168 and out of trip spline 140, thereby disengaging tap drill bit 82 from rotation with counterbore drill bit 92.

In the alternative embodiment, a right-hand threaded spline and counterclockwise rotation are employed. Therefore, the preferred trip spline for the alternate embodiment would be a mirror image of trip spline 140 of FIG. 7.

The tap drill bit 82, which is embedded into sleeve 72 of plug 42, now remains stationary and acts as a guide for counterbore drill bit 92 as it is slowly fed up to and into the plug. Linear progress of the counterbore drill bit 92 is monitored by a linear potentiometer 170. Rod 172 of potentiometer 170 is attached to a potentiometer plate 174 which rides about a heavy duty bearing 176 within an annular groove defined by ledge 178 and retainer 180. Once the drill bit has axially indexed a distance known to be sufficient to release the plug, the potentiometer will indicate that the matching process is complete.

FIG. 9 depicts the outline of drilling of a mechanical plug 42 within tube 28 and tube sheet 18. Once the drill bit has removed all of the plug material lying within the rectangle bounded by line 182, the lands 54 are no longer pressing against the interior of the tube and fall out as rings. The plug is no longer engaging the tube walls but continues to be held within the tube at sleeve 72 by tap drill bit 82.

The remaining tube plug portion is now removable by pulling tap drill bit 82 out of the tube. Since the tap drill bit has been disconnected from drill carrier 96, it must first be recoupled for axial motion therewith. For this purpose, tap drill bushing 152 is provided with slots 184 that accommodate grippers 186 which are hinged onto potentiometer plate 174. When the plug portion is to be removed, actuators (not shown) close grippers 186, forcing ends 188 into slots 184 of tap drill bushing 152, locking tap drill bit 82 and drill carrier 96 together for axial motion. With shifter gear 116 in the down or locked position, activation of air motor 80 results in rapid reverse or withdrawal of drill carrier 96 and counterbore drill bit 92, which simultaneously withdrawals tap drill bit 82 and the attached plug portion from the tube. Heavy duty bearing 176 is provided between potentiometer plate 174 and drill carrier 96 to withstand the forces generated during withdrawal of the plug.

Other types of mechanical, explosive, and welded plugs can be removed through use of a counterbore drill bit sized slightly smaller than the inner diameter of the tube. The counterbore drill bit removes the material holding the plug in engagement with the tube, enabling easy withdrawal of the plug.

The tube plug removal machine is preferably provided with an air jet tube 190 and a suction chamber 83 as shown in FIG. 5. The air jet forces expanding air onto the counterbore bit to remove heat and to dislodge chips generated during plug machining. Vacuum applied to suction chamber 83 through a vacuum port (not shown) removes the dislodged chips. Alternatively, a mixture of air and water can issue from air jet tube 190.

While what has been described is the preferred embodiment of a coupling means and a disengaging means, it is to be understood that other types of coupling and disengaging means which function to release a tap drill bit from a counterbore drill bit once the tap drill bit has engaged the plug are within the contemplated scope of the invention. Also, drive carriers other than the splined threaded carrier and gearing mechanisms other than those described are contemplated.

What is claimed is:

1. A device for removing plugs from plugged tubes in a steam generator, said device comprising:
    a gear box,
    a tap drill bit extending through said gear box and movable with respect thereto from a storage position to an operating position and having a drill point, a tapping section, and a threaded section for respectively drilling into the top of the plug, tapping the drilled hole, and engaging the newly tapped threads with the threaded section of the tap drill bit,
    a counterbore drill bit mounted concentrically about said tap drill bit and movable from a storage position to an operating position, said counterbore drill bit sized to a predetermined diameter not exceeding the inner diameter of the tube,
    coupling means for coupling said tap drill bit to said counterbore drill bit for rotation therewith and for axial indexing therewith,
    motor means attached to said gear box for rotating said counterbore drill bit and, when coupled by said coupling means to said counterbore drill bit, said tap drill bit,
    axial indexing means for axially indexing said counterbore drill bit and, when coupled by said coupling means to said counterbore drill bit, said tap drill bit, and,
    disengaging means for disengaging said coupling means when said tap drill bit has threadably engaged the newly tapped hole, thereby uncoupling said tap drill bit from said counterbore drill bit.

2. The device of claim 1, further comprising a drill carrier attached to said counterbore drill bit and said motor means is adapted to rotate said drill carrier, thereby rotating said counterbore drill bit.

3. The device of claim 2, wherein said axial indexing means translates said counterbore drill about said tap drill bit after said tap drill bit has been uncoupled from rotation with said hollow counterbore drill bit by said disengaging means, said translation bringing said hollow counterbore drill bit into contact with the plug for drilling away plug material to free the plug for removal.

4. The device of claim 3, wherein said coupling means comprises trip pin means connected to said tap drill bit and said disengaging means comprises trip spline means connected to said drill carrier and adapted to engage said trip pin means until said tap drill bit has engaged the hole in the plug, then to release said trip pin means, thereby uncoupling said tap drill bit from said counterbore drill bit.

5. The device of claim 4, further comprising a frame for supporting said motor means and said gear box.

6. The device of claim 5, wherein said frame mounts to the bottom of the tubesheet of the steam generator through locking means.

7. The device of claim 6, wherein the plug includes a shell and a central annular expander member, said tap drill bit is self-centering within the expander member, and said counterbore drill bit is automatically centered about said tap drill bit with respect to the plug.

8. A device for removing plugs from plugged tubes in a steam generator, said device comprises a gear box, a counterbore drill bit extending through the gear box and movable with respect thereto from a storage position to an operating position, an elongated tap drill bit extending longitudinally through said counterbore drill bit and therebeyond, said tap drill bit having at the drilling end thereof a tap drill point for drilling into and engaging the top of the plug, coupling means for nonrotatably coupling said tap drill bit to said counterbore drill bit, axial indexing means for axially indexing said counterbore drill bit and, when coupled through said coupling means, said tap drill bit, and motor means attached to said gear box for rotating said counterbore drill bit and, when coupled through said coupling means, said tap drill bit.

9. The device of claim 8, wherein said drilling end of said tap drill bit further comprises a tapping section and a threaded section, said tap drill bit being operative for drilling a hole in the top of the plug, tapping the drilled hole, and engaging the threads of the hole.

10. The device of claim 9, further comprising disengaging means for disengaging said tap drill bit from said counterbore drill bit when said tap drill bit has engaged the drilled hole in the plug.

11. The device of claim 10, wherein said counterbore drill bit is operative to remove a portion of the plug to lessen the resistance of the plug to removal from the tube.

12. The device of claim 11, wherein said axial indexing means axially indexes said tap drill bit after said counterbore drill bit has removed a portion of the plug for withdrawing the balance of the plug from the tube.

13. The device of claim 12, further comprising a drill carrier attached to said counterbore drill bit.

14. The device of claim 13, wherein said coupling means comprises trip pin means connected to said tap drill bit and said disengaging means comprises trip spline means connected to said drill carrier operative to engage said trip pin means for coupling said tap drill bit to said counterbore drill bit until said tap drill bit has engaged the drilled hole in said plug, then to disengage said trip pin means for uncoupling said tap drill bit from said counterbore drill bit.

15. The device of claim 14, wherein said axial indexing means comprise a feed gear and a drive gear operable to engage said drill carrier.

16. The device of claim 15, wherein said drill carrier is splined and threaded about its exterior.

17. A device for removing plugs from plugged tubes in a steam generator, said device comprising:
a frame,
a gear box mounted on said frame,
a counterbore drill bit extending through said gear box and movable with respect thereto between an operating and a storage position, said counterbore drill bit having a drilling tip sized to a diameter not exceeding the inner diameter of the tube,
a tap drill bit extending longitudinally through said counterbore drill bit, movable with respect thereto, and having a drilling end comprising a drill point, a tap section and a threaded section, for drilling a hole in the top of the plug, tapping the hole, then threading into the newly tapped hole,
a threaded splined drill carrier attached to said counterbore drill bit opposite said drilling tip,
coupling means for coupling said tap drill bit to said counterbore drill bit, said coupling means comprising trip pin means connected to said tap drill bit,
motor means attached to said gear box for rotating said counterbore drill bit and, when coupled by said coupling means to said counterbore drill bit, said tap drill bit,
axial indexing means for axially indexing said counterbore drill bit and, when coupled by said coupling means to said counterbore drill bit, said tap drill bit, said axial indexing means comprising a feed gear and a drive gear for engaging said drill bit carrier, said axial indexing means operative for indexing said counterbore drill bit toward or away from said tube, and
disengaging means for disengaging said coupling means when said tap drill bit has threaded into the hole in the plug thereof, thereby uncoupling said tap drill bit from said counterbore drill bit, said disengaging means comprising trip spline means connected to said counterbore drill bit through said drill carrier and adapted to receive said trip pin means and connecting means operative to axially connect with free rotation said tap drill to said drill carrier after said trip pin means has disengaged from said trip spline means, whereby said tap drill bit drills into and engages the plug and is disengaged from the counterbore drill bit, axial indexing means and motor means, said counterbore drill bit drills out a portion of the tube plug to lessen resistance of the plug to removal, and the plug is removed by axially indexing said tap drill bit away from said tube.

18. A method for removing a plug from a tube, said method comprising:
coupling a tap drill bit to a counterbore drill bit, the counterbore drill bit being concentrically disposed about the tap drill bit, for rotation of the tap drill bit by rotating the counterbore drill bit with a motor and for axially indexing the tap drill bit by axially indexing the counterbore drill bit,
drilling a hole in the plug with the tap drill bit, the tap drill bit having a drill point, a tapping section and a threaded section;
tapping the hole with the tapping section of the tap drill bit;
threading the hole with the threaded section of the tap drill bit;
drilling away a predetermined portion of the plug with the counterbore drill bit mounted concentrically about the tap drill bit for axial movement with respect thereto to release the plug from the tube; and
pulling the tap drill bit out of the tube to remove the remaining portion of the plug from the tube.

19. The method according to claim 18 wherein the plug is welded in place and the counterbore drill bit is nearly as large as the inner diameter of the tube.

20. The method according to claim 18 wherein the plug is a mechanical plug.

21. The method according to claim 20 wherein the mechanical plug has an annular expander member with a central hole therethrough and the tap drill bit is sized to pass through the central hole.

22. The method according to claim 18 further comprising disengaging the tap drill bit from rotation with the counterbore drill bit by the motor means before said drilling with the counterbore drill bit, and axially indexing the counterbore drill bit about the disengaged tap drill bit until the predetermined portion of the plug is removed.

23. The method according to claim 22 wherein the coupling means comprises a trip pin means attached to the tap drill bit and the disengaging means comprises trip spline means attached to the counterbore drill bit.

* * * * *